US010428576B2

(12) United States Patent
Shinnaka et al.

(10) Patent No.: US 10,428,576 B2
(45) Date of Patent: Oct. 1, 2019

(54) STORAGE FACILITY FOR OBJECT OF PAYING OF RESPECTS

(71) Applicant: Daifuku Co., Ltd., Osaka-shi (JP)

(72) Inventors: Hidenobu Shinnaka, Tokyo (JP); Haruhito Furuya, Tokyo (JP); Wataru Kiyokawa, Tokyo (JP); Hideki Sato, Tokyo (JP); Yukinori Kameda, Tokyo (JP); Kazuya Arima, Tokyo (JP)

(73) Assignee: Daifuku Co., Ltd., Osaka-shi (JP)

( * ) Notice: Subject to any disclaimer, the term of this patent is extended or adjusted under 35 U.S.C. 154(b) by 0 days.

(21) Appl. No.: 15/925,919

(22) Filed: Mar. 20, 2018

(65) Prior Publication Data

US 2018/0274286 A1  Sep. 27, 2018

(30) Foreign Application Priority Data

Mar. 22, 2017  (JP) .................................. 2017-055644

(51) Int. Cl.
*E04H 13/00* (2006.01)
*E06B 7/28* (2006.01)
(Continued)

(52) U.S. Cl.
CPC ................ *E06B 7/28* (2013.01); *B65G 1/045* (2013.01); *B65G 1/0435* (2013.01); *B65G 1/12* (2013.01)

(58) Field of Classification Search
CPC ... E04H 13/006; E04H 13/008; B65G 1/0435; B65G 1/06; E06B 2009/2464; E06B 9/24
See application file for complete search history.

(56) References Cited

U.S. PATENT DOCUMENTS 4,739,595 A * 4/1988 Yamagata ............... E04H 13/00
                                                    312/33
7,040,057 B2 * 5/2006 Gallant ..................... A61G 7/00
                                                   52/36.1

(Continued)

FOREIGN PATENT DOCUMENTS

JP          3108055 A       4/1997
JP        2002235459    *   8/2002

*Primary Examiner* — Brian E Glessner
*Assistant Examiner* — Daniel J Kenny
(74) *Attorney, Agent, or Firm* — The Webb Law Firm

(57) ABSTRACT

A storage facility for objects of paying of respects includes a partition wall located to partition off the support position from a respects-paying position for a person visiting to pay respects, a window member including a variable-light-transmittance member whose light transmittance is adjustable, an illuminating device for which an amount of light emitted thereby is adjustable, and a controller. A window for allowing the person visiting to pay respects to view an object of paying of respects is formed in an area, of the partition wall, toward which the object of paying of respects faces when supported in the support position. The window is provided with a window member. And the illuminating device is so positioned that light therefrom reaches the object of paying of respects supported in the support position. The controller is configured to increase at least one of the light transmittance of the window member and the amount of light emitted by the illuminating device as an object of paying of respects arrives at the support position through a transport operation of the transport device.

5 Claims, 6 Drawing Sheets

(51) Int. Cl.
*B65G 1/04* (2006.01)
*B65G 1/12* (2006.01)

(56) References Cited

U.S. PATENT DOCUMENTS

| | | | |
|---|---|---|---|
| 2003/0019165 A1* | 1/2003 | Gallant | A61G 7/00 |
| | | | 52/36.4 |
| 2006/0245858 A1* | 11/2006 | Suess | B65G 1/0435 |
| | | | 414/277 |
| 2010/0165639 A1* | 7/2010 | Skeele | E04H 13/006 |
| | | | 362/326 |
| 2011/0044792 A1* | 2/2011 | Talley | B65G 1/0407 |
| | | | 414/807 |
| 2018/0233391 A1* | 8/2018 | Ogo | B65G 1/04 |

* cited by examiner

STORAGE FACILITY FOR OBJECT OF PAYING OF RESPECTS

CROSS-REFERENCE TO RELATED APPLICATION

This application claims priority to Japanese Patent Application No. 2017-055644 filed Mar. 22, 2017, the disclosure of which is hereby incorporated in its entirety by reference.

FIELD OF THE INVENTION

The present invention relates to a storage facility for objects of paying of respects comprising a plurality of storage sections each configured to store an object of paying of respects, a respects-paying area which includes an area for a person, visiting to pay respects, to pay respects, and a transport device configured to transport an object of paying of respects between any of the plurality of storage sections and a support position provided in the respects-paying area.

BACKGROUND ART

An example of a storage facility for object of paying of respects is described in JP Publication of Application No. H09-108055 (Patent Document 1). The storage facility for object of paying of respects described in Patent Document 1 is a three-dimensional altar device in which containers (10), each holding a mortuary tablet, or a funerary urn, etc., are the objects of paying of respects. The facility includes a plurality of storage rooms (23) for storing the containers (10), a chapel portion (27) where a person visiting to pay respects pays respects, and a transport device (30) for transporting a container (10) between a storage room (23) and the chapel portion (27). And when a person visits to pay respects, a desired container (10) is taken out from a storage room (23), and is transported to the chapel portion (27) by the transport device (30). The front face (16) of each container (10) is a display surface for displaying a posthumous Buddhist name, a common name or a photography of the deceased, etc. And when a container (10) is placed in the chapel portion (27), a person visiting to pay respects can view the display surface from the front of the chapel portion (27).

SUMMARY OF THE INVENTION

As such, an object of paying of respects is transported to the respects-paying area by the transport device in a storage facility for object of paying of respects such as one described above. However, because the object of paying of respects to which the act of paying of respects is directed is transported by a machine, namely the transport device, the solemn atmosphere which a person visiting to pay respects would expect in a respects-paying area may not be realized. However, Patent Document 1 does not make any specific statement that indicates awareness of such issue.

Thus, a storage facility for object of paying of respects is desired in which any loss of the solemn atmosphere caused by the transporting of the object of paying of respects by a transport device can be reduced.

A storage facility for objects of paying of respects in accordance with the present disclosure comprises: a plurality of storage sections each configured to store an object of paying of respects; a respects-paying area which includes an area for a person, visiting to pay respects, to pay respects; and a transport device configured to transport an object of paying of respects between any of the plurality of storage sections and a support position provided in the respects-paying area; a partition wall located in the respects-paying area to partition off the support position from a respects-paying position for a person visiting to pay respects; a window member including a variable-light-transmittance member whose light transmittance is adjustable; an illuminating device for which an amount of light emitted thereby is adjustable; and a controller configured to control the light transmittance of the window member and the amount of light emitted by the illuminating device; wherein a window for allowing the person visiting to pay respects to view an object of paying of respects is formed in an area, of the partition wall, toward which the object of paying of respects faces when supported in the support position, wherein the window member is located in the window, wherein the illuminating device is so positioned that light therefrom reaches the object of paying of respects supported in the support position, and wherein the controller is configured to increase at least one of the light transmittance of the window member and the amount of light emitted by the illuminating device as an object of paying of respects arrives at the support position through a transport operation of the transport device.

With the arrangement described above, the window member including a variable-light-transmittance member whose light transmittance is adjustable is provided to the window, and the illuminating device for which the amount of emitted light can be adjusted is so positioned that the light therefrom can reach the object of paying of respects supported in the support position. Therefore, the visibility of an area on the support position side with respect to the window as seen by the person visiting to pay respects can be controlled by adjusting the light transmittance of the window member and/or by adjusting the amount of light from the illuminating device. And the controller, configured to control the light transmittance of the window member and the amount of light emitted by the illuminating device, is configured to increase at least one of the light transmittance of the window member and the amount of light emitted by the illuminating device as an object of paying of respects arrives at the support position through a transport operation of the transport device. Thus, for example, the visibility can be maintained at a reduced and low level before the arrival of the object of paying of respects at the support position and the visibility can be maintained at a high level after the arrival of the object of paying of respects at the support position. This arrangement makes it more unlikely and difficult for the attention of a person visiting to pay respects to be drawn to the fact that an object of paying of respects is transported by the transport device, thus reducing any loss of solemn atmosphere in the respects-paying area, before the arrival of the object of paying of respects at the support position. And the visibility of the object of paying of respects at the support position as seen from a person visiting to pay respects can be maintained at a high level after the arrival of the object of paying of respects at the support position for an increased satisfaction of the person visiting to pay respects.

Note that there is an added benefit that such visibility can be controlled while maintaining the solemn atmosphere in the respects-paying area because the control of the visibility of the area on the support position side of the window as seen from a person visiting to pay respects is performed by adjusting the light transmittance of the window member and/or the amount of light from the illuminating device, which is a method that would not involve moving mechanical parts that may be visible to the person paying respects.

Thus, with the arrangement described above, a storage facility for objects of paying of respects can be provided in which any loss of the solemn atmosphere caused by the transporting of an object of paying of respects by a transport device can be reduced.

DETAILED DESCRIPTION OF EMBODIMENTS

Figure 1:
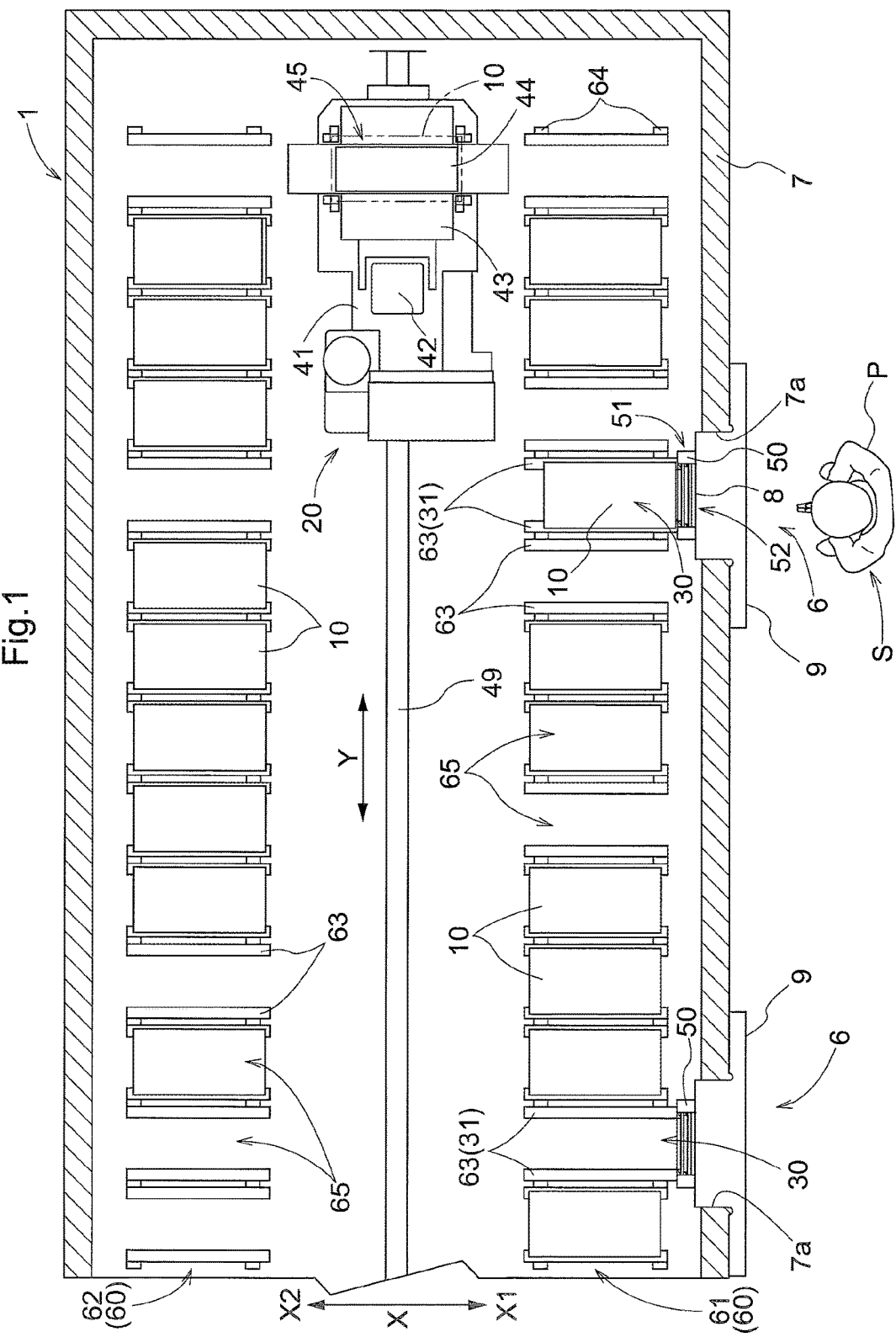
FIG. 1 is a plan view of a storage facility for objects of paying of respects.
Figure 2:
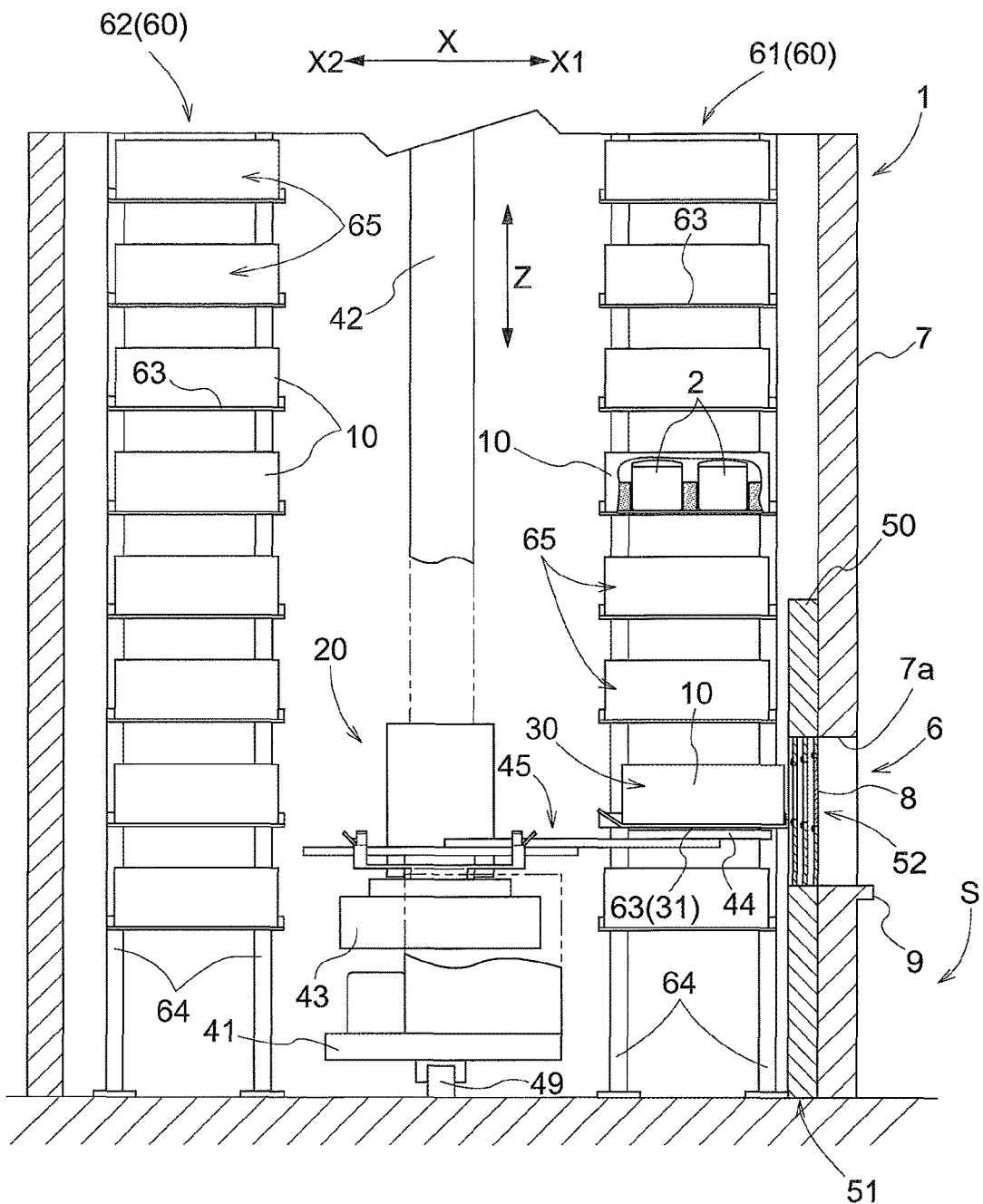
FIG. 2 is a side view of the storage facility for objects of paying of respects.

Embodiments of a storage facility for objects of paying of respects are described with reference to the attached drawings. As shown in FIGS. 1 and 2, a storage facility for object of paying of respects (referred to hereinafter simply as the storage facility 1) is a facility which includes a plurality of storage sections 65 each for storing an "object 10 of paying of respects", respects-paying areas 6 each of which includes an area for a person P (visiting to pay respects) to pay respects, and a transport device 20 which transports an object 10 of paying of respects between a storage section 65 and a support position 30 provided in the corresponding respects-paying area 6. Note that, as can be understood from the description below, each respects-paying area 6 also includes an area for an object of paying of respects which includes an area surrounding an object of paying of respects when such object is in a support position described below, thus, each respects-paying area 6 includes an area intended for a person visiting to pay respects to be oriented toward when paying respects. As such, the respects-paying area 6 includes a respects-paying portion which includes a support portion described below as well as a portion that can provide an area for a person (visiting to pay respects) to pay respects, among other things that may be described to be provided in a respects-paying area. That is, the storage facility 1 is a facility which people visit to pay respects. The storage facility 1 includes a controller 5 (see FIG. 4) configured to control operation of the transport device 20. And when commanded by the controller 5, the transport device 20 transports an object 10 of paying of respects (that the person P visiting to pay respects intends to see) from a storage section 65 to a support position 30 and also transports the object 10 of paying of respects from a support position 30 to a storage section 65 after the person finishes the paying of respects.

As shown in FIG. 2 in which a portion of a side surface of one object 10 of paying of respects is removed to show its inside, an object 10 of paying of respects is a container (a container for religious purposes) for holding, or configured to hold, a funerary urn containing a deceased's cremated remains, and is generally formed in a box shape (or in a shape of a rectangular parallelepiped in the present example) which forms a space for accommodating one or more objects 2 held within the container (housed objects 2 for short). A funerary urn, as a housed object 2, may contain cremated remains such as cremated pieces of bone of a deceased person or pet (referred to hereinafter simply as "cremated remains"). The housed object 2 can also be a container other than a funerary urn, such as a bag containing cremated remains. In addition, a housed object 2 (or object or material contained in a housed object 2) may be something other than cremated pieces of bone and may be ashes of the deceased person or pet (referred to hereinafter simply as "ashes"), a manufactured object containing cremated pieces of bone and/or ashes (for example, a mortuary tablet, a religious statue such as that of Buddha, etc.), a manufactured object containing no cremated pieces of bone or ashes (for example, a mortuary tablet, a religious statue, such as, that of Buddha, Christ or Mary, etc.), or an article which is left by, or reminds of, the deceased or pet, etc., or any combination thereof.

Figure 3:
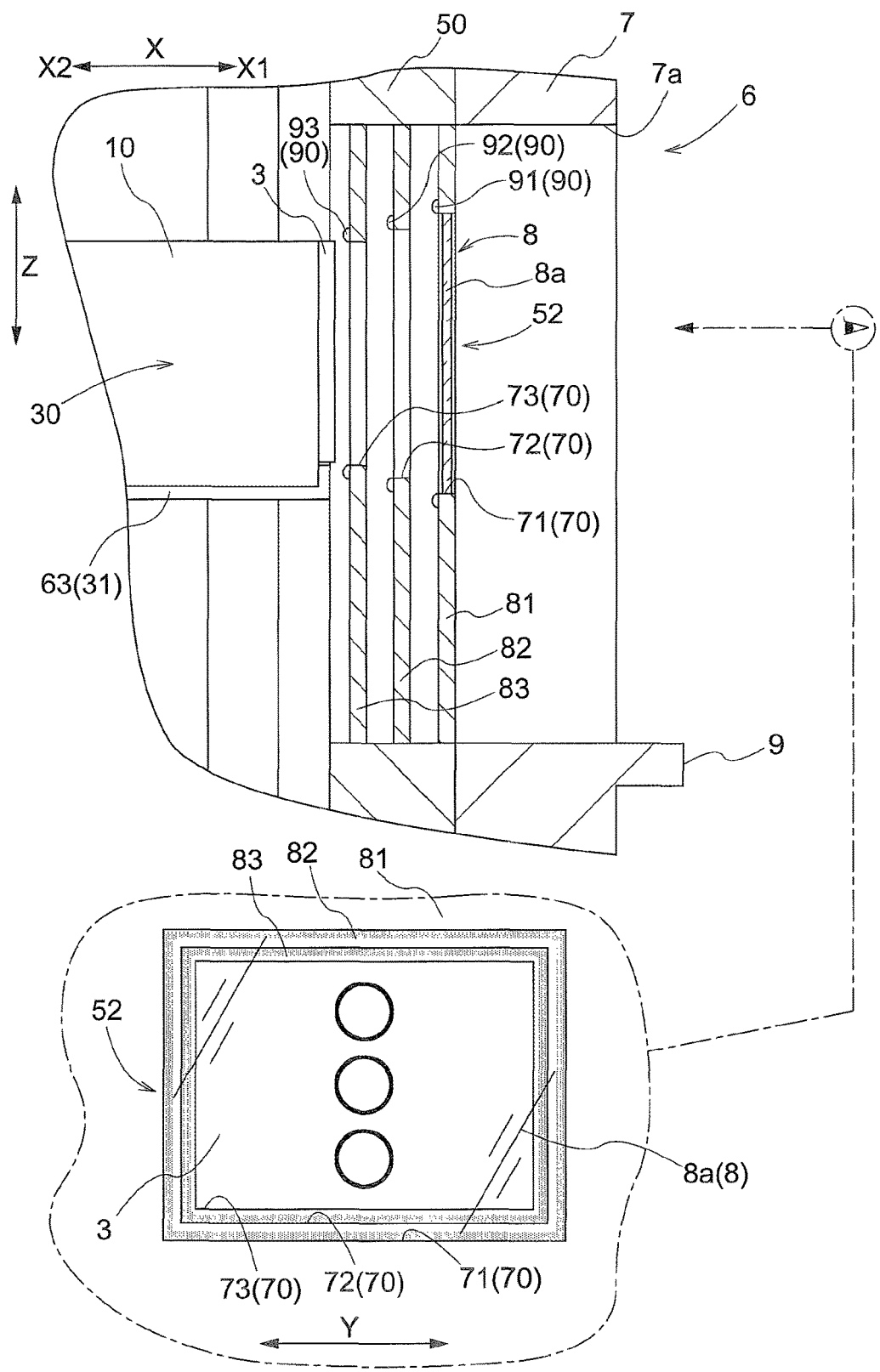
FIG. 3 is a side view of an area of a respects-paying area of the storage facility for objects of paying of respects, and a frontal view of a window.
Figure 6:
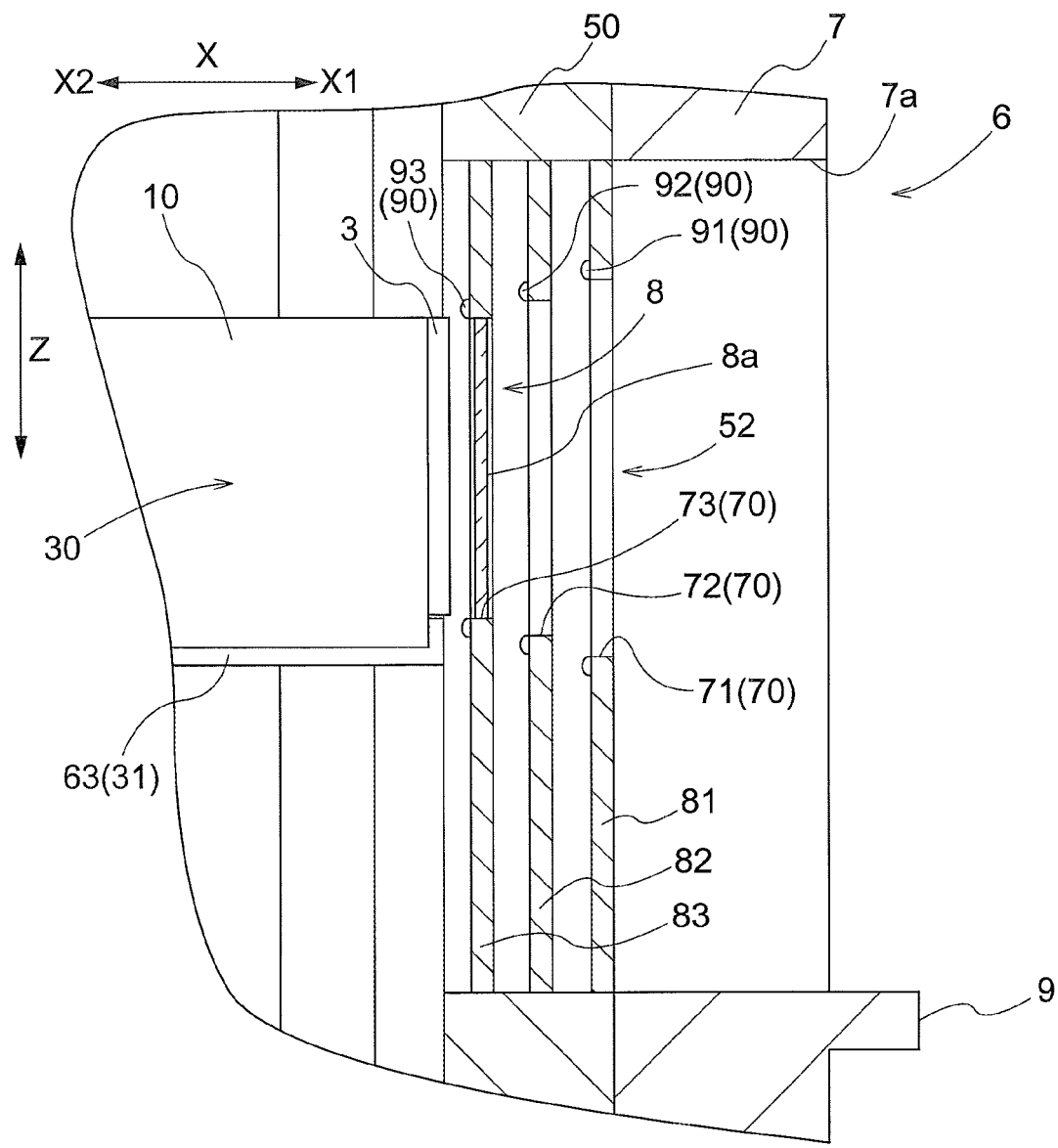
FIG. 6 is a side view of an area of a respects-paying area of the storage facility for objects of paying of respects in accordance with another embodiment.
Figure 7:
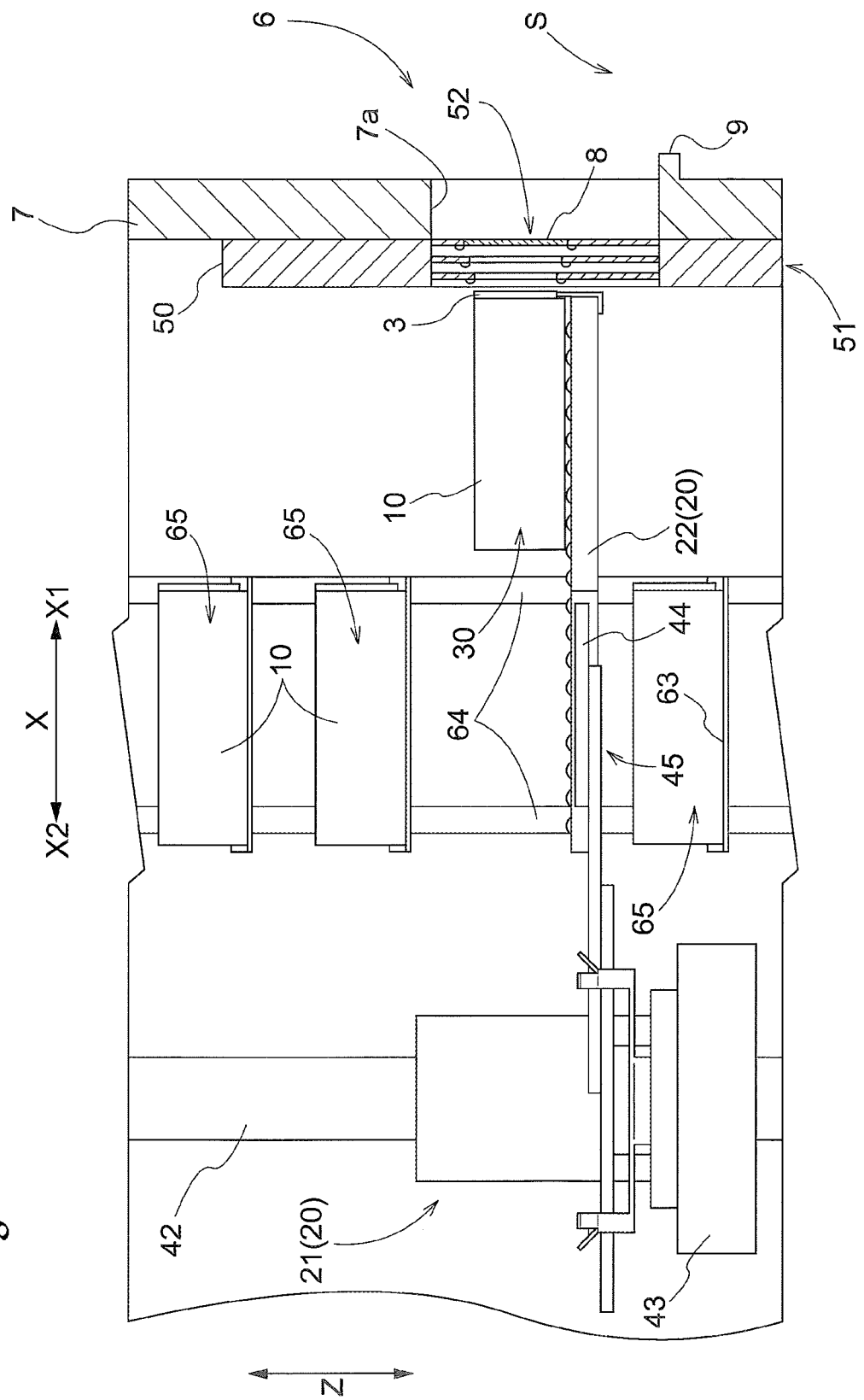
FIG. 7 is a side view of a storage facility for objects of paying of respects in accordance with another embodiment.

As shown in FIG. 3, each object 10 of paying of respects has a plate-shaped member 3 (generally flat and thin (thickness is less than its length and width)) with information related to the housed object 2 shown on it. Note that the plate-shaped member 3 is shown only in FIGS. 3, 6, and 7 (FIGS. 6 and 7 will be referred to below), and that simplified forms of the objects 10 of paying of respects are shown in drawings other than these drawings, without showing the plate-shaped members 3. The plate-shaped member 3 is attached to a side surface (outer surface of a side wall) of a main body portion (generally box shaped portion) which forms the accommodating space for the housed object 2 in an object 10 of paying of respects. The main body portion of an object 10 of paying of respects may be formed, for example, with metallic materials (stainless steel etc.) whereas the plate-shaped member 3 may be a slab of stone, or may be made with, for example, stone material. The information related to the housed object 2 is expressed by a set of characters, one or more designed figures, one or more symbols, or a combination thereof. And the information is carved, printed, etc., so that it is visible on a surface of the plate-shaped member 3 (i.e., on an outward surface when the plate-shaped member 3 is attached to the main body portion of an object 10 of paying of respects). Examples of the information related to the housed object 2 include the deceased's family name, the deceased's family crest or symbol, the deceased's favorite words or saying.

As shown in FIG. 2, a partition wall 50 extending vertically (i.e., extending generally along a vertical direction Z) is provided in the corresponding respects-paying area 6. The partition wall 50 is so located to partition off a support position 30 from a respects-paying position S which is a position for a person P (visiting to pay respects) to pay respects (i.e., to divide an neighboring area into an area in which the respects-paying position S is located and an area in which a support position 30 is located), with the division being located in a partition position 51 (see FIGS. 1 and 2) along the first direction X extending along, i.e., parallel to, a horizontal plane. And a window 52 (an opening for the purposes of paying respects) for allowing a person P visiting to pay respects to view an object 10 of paying of respects is formed in an area or a portion (of the partition wall 50) toward which an object 10 of paying of respects faces along the first direction X when supported in the support position 30. Therefore, when a person P visiting to pay respects, they can view the object 10 of paying of respects supported in the support position 30 through the window 52. The window 52 is formed to correspond in shape and dimensions to those of the plate-shaped member 3, and is rectangular in shape in the present embodiment. As shown in FIG. 1-FIG. 3, window member 8 is located in, and provided to, the window 52. The detailed description of the window member 8 is provided below.

As shown in FIG. 3, an object 10 of paying of respects is supported in a support position 30 such that the plate-shaped member 3 is oriented toward a first side X1 where the first side X1 is defined as the side, along the first direction X, on which the window 52 is located with respect to the support position 30 (in other words, the side, along the first direction X, on which the window 52 is located with respect to the support portion 31 described below) while the side opposite to the first side X1 is defined as a second side X2. Therefore, the person P visiting to pay respects can view the plate-shaped member 3 of the object 10 of paying of respects supported in a support position 30, through the window 52.

As shown in FIGS. 1 and 2, each storage rack 60 is formed with a plurality of storage sections 65 located in the same position along the first direction X. The plurality of storage sections 65 which form each storage rack 60 are arranged in a plurality of horizontal rows with one horizontal row located above another along a vertical direction Z and in a plurality of vertical rows with one vertical row located next to another along a second direction Y (which is a direction perpendicular to the first direction X in a horizontal plane). In other words, each storage rack 60 is so oriented that a rack depth or thickness direction is parallel to the first direction X whereas a rack lateral direction is parallel to the second direction Y. Each storage rack 60 includes a plurality of support columns 64 extending along the vertical direction Z, and a plurality of support arms 63 (each of which includes a generally-plate-shaped member) extending along the first direction X. Each support arm 63 is fixed to each of a pair of support columns 64 that are adjacent each other along the first direction X. The storage sections 65 are divided into individual sections by the support columns 64 along the second direction Y and by the support arms 63 along the vertical direction Z. As shown in FIG. 1, each object 10 of paying of respects is stored in a storage section 65 with the object 10 being supported by a pair of support arms 63 that are spaced apart from each other along the second direction Y. Each storage section 65 is configured to store one object 10 of paying of respects. A pair of storage racks 60 are provided such that that they face each other along the first direction X. In the following description, one of the storage racks 60 of the pair that is located on the first side X1 will be referred to as the first storage rack 61 whereas the other of the storage racks 60 of the pair that is on the second side X2 will be referred to as the second storage rack 62.

The storage facility 1 includes walls 7 that surround a side perimeter of the storage racks 60 of the pair (perimeter as seen along the vertical direction). And the transport device 20 transports objects 10 of paying of respects, one at a time, within the area surrounded by the walls 7. As shown in FIGS. 1-3, a wall 7 (a wall that divides an neighboring area into an area in which the respects-paying position S is located and an area in which the support position 30 is located) at least a part of which is located in the corresponding respects-paying area 6 is located on the first side X1 with respect to the partition wall 50. And an opening 7a is formed in a portion or area of the wall 7 which the window 52 would have otherwise faced along the first direction X. The opening 7a is so formed that the entire window 52 is included, or can be seen through the opening 7a, as seen along the first direction X so that a person P visiting to pay respects can view an object 10 of paying of respects supported in the support position 30 through the opening 7a and the window 52. An altar 9 on which incense sticks, an offering, etc., may be placed is formed in a portion of the wall 7 that defines the lower edge of the opening 7a. In addition, a gravestone pattern (for example, a granite pattern or design that imitates a gravestone surface) is applied to, attached to, or otherwise placed on, a surface of the wall 7 (the surface that faces the first side X1) around the opening 7a.

As shown in FIGS. 1 and 2, each support position 30 is provided, or defined, in place of one or more storage sections 65 in the first storage rack 61. More specifically, in the first storage rack 61, a plurality of unit spaces each for forming one storage section 65 (with each unit space being defined by adjacent support arms 63 and adjacent support columns 64) are arranged in a plurality of horizontal rows with one horizontal row located above another along the vertical direction Z and in a plurality of vertical rows with one vertical row located next to another along the second direction Y. Some of these unit spaces are used instead to define the support positions 30. And, as shown in FIG. 1, in each support position 30, an object 10 of paying of respects can be supported from below by a pair of support arms 63 that are located to be spaced apart, and adjacent, along the second direction Y, from each other. That is, each support portion 31 which is configured to support an object 10 of paying of respects in the support position 30 is formed by a pair of support arms 63 provided at the support position 30. Thus, a support portion 31 on which an object 10 of paying of respects transported by the transport device 20 is placed is provided for and at each support position 30.

As shown in FIGS. 1 and 2, the transport device 20 is a stacker crane. More specifically, the transport device 20 includes a travel member 41 configured to travel while being guided by a rail 49 installed on a floor surface, a mast 42 arranged vertically on the travel member 41, a vertically movable member 43 which can be raised and lowered (or movable along the vertical direction Z) while being guided by the mast 42, and a transfer device 45 supported by the vertically movable member 43. The controller 5 controls the operation of the transport device 20 (more specifically, traveling operation of the travel member 41, vertical movement operation of the vertically movable member 43, and transfer operation of the transfer device 45) based on detected information from various sensors (for example, rotary encoder, etc.).

The controller 5 includes a processor such as a microcomputer, and a peripheral circuit such as a memory. And each function of the controller 5 is performed through collaboration between such hardware and one or more computer programs executed by hardware, such as a processor. The controller 5 may be provided to the transport device 20, or may be provided separately from the transport device 20. In addition, when the controller 5 includes a plurality of pieces or parts of hardware that are separated from each other in a way that they can communicated with each other, one or more pieces or parts of hardware may be provided to the transport device 20 while the remaining pieces or parts of hardware may be provided separately from the transport device 20.

The transfer device 45 is a device configured to transfer an object 10 of paying of respects between a support portion (lower-end support portion 44 described below) of the transport device 20 for supporting an object 10 of paying of respects and a support portion (a pair of support arms 63 in the present example) of a transfer target (a storage section 65 or a support position 30) for supporting an object 10 of paying of respects. The transfer device 45 includes a slide-out mechanism configured to project and retract the lower-end support portion 44 configured to support from below an object 10 of paying of respects along, i.e., parallel to, the first direction X. And the slide-out mechanism 44 projects and retracts the lower-end support portion 44 along the first direction X between a retracted position (position of the lower-end support portion 44 shown in FIG. 1) in which the lower-end support portion 44 is retracted (i.e., is in a retracted state) toward the vertically movable member 43 and a projected position (position of the lower end support portion 44 shown in FIG. 2) in which the first support member 44a is projected (i.e., is in a projected state) relative to this retracted position toward the transfer target location. The width of the lower-end support portion 44 along the second direction Y is less than the distance, along the second direction Y, between the support arms 63 forming a pair. This slide-out mechanism is configured to be capable of moving the lower-end support portion 44 to a projected position located on one side with respect to the retracted position along the first direction X and also to a projected position located on the opposite side with respect to the retracted position along the first direction X.

A transfer operation of an object 10 of paying of respects from the lower-end support portion 44 to a storage section 65 by the transfer device 45 is described next. Firstly, the transport device 20 moves the lower-end support portion 44 (in a retracted position with an object 10 of paying of respects supported thereon) to an upper target position set for, and with respect to, the storage section 65, that is the transfer target, through a traveling operation of the travel member 41 and the vertical movement operation of the vertically movable member 43. Next, the transport device 20 moves the lower-end support portion 44 from the retracted position to the projected position by means of the slide-out mechanism of the transfer device 45. When the storage section 65 that is the transfer target is a storage section 65 in the first storage rack 61, then the lower-end support portion 44 is moved toward the first side X1 to the projected position on the first side X1 with respect to the retracted position whereas, when the storage section 65 that is the transfer target is a storage section 65 in the second storage rack 62, then the lower-end support portion 44 is moved toward the second side X2 to the projected position on the second side X2 with respect to the retracted position. Subsequently, the transport device 20 lowers the lower-end support portion 44 to unload the object 10 of paying of respects onto the storage section 65 through vertical movement operation of the vertically movable member 43, after which, the lower-end support portion 44 is moved to the retracted position from the projected position by the slide-out mechanism of the transfer device 45.

A detailed description of a transfer operation by the transfer device 45 of an object 10 of paying of respects from the lower-end support portion 44 to a support portion 31 is omitted here since this operation is identical to the transfer operation of the object 10 of paying of respects from the lower-end support portion 44 to a storage section 65 of the first storage rack 61 as described above, except for the fact that the upper target position in the description above is replaced by an upper target position for the support portion 31. Note that, as shown in FIG. 2, the position at which an object 10 of paying of respects is supported at the support position 30 is displaced or shifted toward the first side X1 relative to the position at which an object 10 of paying of respects is supported in a storage section 65 of the first storage rack 61; thus, the projected position for transferring an object 10 of paying of respects to a support portion 31 is set to be located more toward the first side X1 than the projected position for transferring an object 10 of paying of respects to a storage section 65 of the first storage rack 61.

A transfer operation of the object 10 of paying of respects from a storage section 65 to the lower-end support portion 44 by the transfer device 45 is described next. Firstly, the transport device 20 moves the lower-end support portion 44 in the retracted position to a lower target position set or defined for, and with respect to, the storage section 65 (which is the transfer target) through a traveling operation of the travel member 41 and a vertical movement operation of the vertically movable member 43. Next, the transport device 20 moves the lower-end support portion 44 from the retracted position to the projected position by means of the slide-out mechanism of the transfer device 45, and subsequently, raises the lower-end support portion 44 through a vertical movement operation of the vertically movable member 43 to pick up an object 10 of paying of respects from the storage section 65 with the lower-end support portion 44, and then, causes the lower-end support portion 44 to be moved from the projected position to the retracted position by means of the slide-out mechanism of the transfer device 45. The projected position referred to here is either the projected position on the first side X1 or the projected position on the second side X2 with respect to the retracted position, depending on whether the storage section 65 that is the transfer target is one in the first storage rack 61 or the second storage rack 62, as was the case of the transfer operation of the object 10 of paying of respects from the first support member 44a to a storage section 65 by the transfer device 45. In addition, with regard to the upper target position and the lower target position set or defined for any of the storage section 65, the lower target position is set to be at the same position along the second direction Y as the upper target position, and is set to be lower along the vertical direction Z than the upper target position by a set distance.

A detailed description of the transfer operation of the object 10 of paying of respects from a support portion 31 to the lower-end support portion 44 by the transfer device 45 is omitted here since this operation is identical to the transfer operation of the object 10 of paying of respects from a storage section 65 of the first storage rack 61 to the lower-end support portion 44 as described above, except for the fact that the lower target position referred to above is replaced by the lower target position set or defined for the support portion 31. In addition, with regard to the upper target position and the lower target position set or defined for any support portion 31, the lower target position is set to be at the same position along the second direction Y as the upper target position, and is set to be lower along the vertical direction Z than the upper target position by a set distance.

As described above, the window member 8 is located in, and provided to, the window 52 for a person P visiting to pay respects to view the object 10 of paying of respects supported at the support position 30. As shown in FIG. 3, the window 52 (formed by openings 70 described below) is formed to be rectangular in shape as seen along the first direction X. And the window member 8 is formed to have a shape of a rectangular flat plate (i.e., the outline of the flat plate is rectangular in shape) that is so dimensioned to fit into an opening 70 with the plate being generally flat and thin (thickness is less than its length and width). And the window member 8 includes, and makes use of, a variable-light-transmittance member 8a which is a member whose light transmittance can be adjusted. For example, the window member 8 may have a structure in which a variable-light-transmittance member 8a is placed between two sheets of glass, or one in which a variable-light-transmittance member 8*a* is attached to a surface (a surface that faces toward the first side X1 or a surface that faces toward the second side X2 when installed in the window 52) of a glass substrate (i.e., a sheet of glass). The variable-light-transmittance member 8*a* is a variable-light-transmittance device which can be switched between a transparent state (with high light transmittance) and a non-transparent state (with low light transmittance), and may be of any type that makes use of any physical or chemical principle(s), such as a liquid-crystal type in which the orientation of liquid crystal molecules is controlled to change its light transmittance, or an electrochromic type in which its light transmittance is changed by an electrochemical reaction, among other possibilities. The variable-light-transmittance member 8*a* may also be provided in the form of a sheet or a film. In addition, the variable-light-transmittance member 8*a* may include, and make use of, material, substance, element(s), or a device that turns milk white, into a dark color, or becomes reflective, when switched to the non-transparent state.

The controller 5 controls the light transmittance of the window member 8, which includes the variable-light-transmittance member 8*a*, by controlling a light-transmittance varying device 25 (see FIG. 4) for varying, or adjusting, the light transmittance of the variable-light-transmittance member 8*a*. When a variable-light-transmittance device whose light transmittance can be controlled electrically (e.g., a variable-light-transmittance device of a liquid crystal type or of an electrochromic type) is used as the variable-light-transmittance member 8*a*, the light-transmittance varying device 25 is a voltage-control device which controls the supply voltage to the variable-light-transmittance member 8*a*. And the controller 5 adjusts the light transmittance of the window member 8 by controlling the supply voltage to the variable-light-transmittance member 8*a* (for example, by switching between applying voltage and applying no voltage) through the light-transmittance varying device 25.

As shown in FIG. 3, an illuminating device 90 whose amount of light can be adjusted is provided in the corresponding respects-paying area 6. The illuminating device 90 is so located that its light can reach, or can be incident on, the object 10 of paying of respects supported in the support position 30. More specifically, the illuminating device 90 is located in a position where its light can be incident on, or can reach, the end surface (surface of the plate-shaped member 3), on the first side X1, of an object 10 of paying of respects. And the amount of light emitted by, or from, the illuminating device 90 is controlled by the controller 5 (see FIG. 4). In the present embodiment, the illuminating device 90 includes a plurality of light sources. The object 10 of paying of respects supported by the support position 30 is irradiated with light emitted from at least some of the plurality of the light sources. In addition, each light source may be any of: a point or localized source (incandescent lamp, light emitting diode, etc.); an extended light source (fluorescent lights etc.); and a surface or two dimensional light source (organic EL light source etc.); or any combination thereof. And the controller 5 adjusts the amount of light from the illuminating device 90 (total amount of light from the entire illuminating device 90) by controlling at least one of: the number of the light sources that are caused to emit light; and the amount of light from each light source.

As described above, by providing the window 52 with the window member 8 which includes the variable-light-transmittance member 8*a* whose light transmittance is adjustable (i.e., can be adjusted) and by positioning the illuminating device 90 whose amount of light is adjustable (i.e., can be adjusted) such that light can reach, or can be incident on, the object 10 of paying of respects supported in the support position 30, the visibility of an area on the support position 30 side with respect to the window 52 (a part of an area in which the transport device 20 and the storage racks 60 are provided) as seen by the person P visiting to pay respects can be controlled by adjusting the light transmittance of the window member 8 and/or by adjusting the amount of light from the illuminating device 90. That is, the greater the light transmittance of the window member 8 is, the greater the attained visibility becomes. And the greater the amount of light from the illuminating device 90 is, the greater the attained visibility becomes. And the controller 5 is configured to increase both the light transmittance of the window member 8 and the amount of light from the illuminating device 90 as an object 10 of paying of respects arrives at the support position 30 through a transport operation of the transport device 20. This arrangement allows the visibility to be maintained at a high level that is sufficient to satisfy the person P visiting to pay respects who views an object 10 of paying of respects through the window 52 after the arrival of the object 10 of paying of respects at the support position 30 while allowing the visibility to be maintained at a reduced and low level before the arrival of the object 10 of paying of respects at the support position 30. This arrangement makes it more unlikely and difficult for the attention of a person P visiting to pay respects to be drawn to the fact that an object 10 of paying of respects is transported toward the support position 30 by the transport device 20, thus reducing any loss of solemn atmosphere in a respects-paying area 6. In addition, by adopting the arrangement in which the controller 5 controls both the light transmittance of the window member 8, and the amount of light from the illuminating device 90 in this manner, it is possible to obtain greater visual effects in a respects-paying area 6 by simultaneously controlling these two controlled variables (i.e., the light transmittance and the amount of light). For example, solemn atmosphere may be satisfactorily created by gradually increasing or decreasing the values of these two controlled variables.

Figure 5:
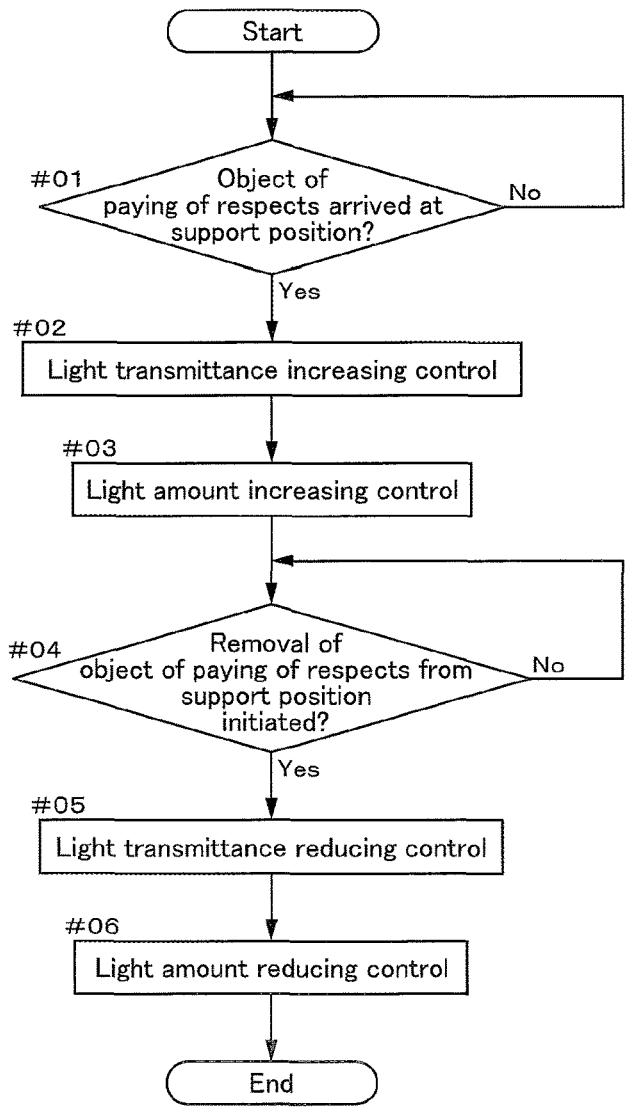
FIG. 5 is a control flow chart.

FIG. 5 shows an example of a control flow executed by the controller 5. As shown in FIG. 5, when an object 10 of paying of respects reaches the support position 30 (Step #01: Yes), the controller 5 performs a light transmittance increasing control (Step #02) by which the light transmittance of the window member 8 is increased as well as a light amount increasing control (Step #03) by which the amount of light of (emitted by) the illuminating device 90 is increased. For example, the arrangement may be such that, before an object 10 of paying of respects reaches the support position 30, the light transmittance of the window member 8 is maintained at the lowest value within the adjustment range for the light transmittance of the window member 8, and such that the light transmittance of the window member 8 is increased to the highest value within the adjustment range for the light transmittance, in the light transmittance increasing control (Step #02). In addition, for example, the arrangement may be such that, before an object 10 of paying of respects reaches the support position 30, the amount of light of the illuminating device 90 is maintained at the lowest value within the adjustment range for the amount of light of the illuminating device 90 (i.e. at zero which corresponds to the non-illuminating state), and such that the amount of light of the illuminating device 90 is increased to the highest value (e.g., its rated amount of light) within the adjustment range for the amount of light of the illuminating device 90 in the light amount increasing control (Step #03).

Figure 4:
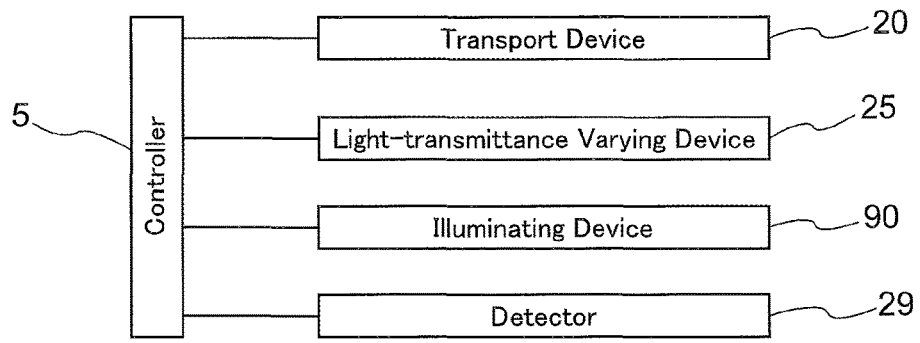
FIG. 4 is a control block diagram.

The controller 5 makes a determination (Step #01) as to whether an object 10 of paying of respects reached the support position 30 based on the detected information from a detector 29 (see FIG. 4). When an object 10 of paying of respects is located in the support position 30, the detector 29 outputs a signal to the controller 5 that is different from a signal it outputs to the controller 5 when an object 10 of paying of respects is not located in the support position 30. For example, the detector 29a may be a sensor which detects whether an object 10 of paying of respects is placed in the support portion 31 (e.g., a sensor having a light emitter/receiver pair that can be used to determine if emitted light is blocked, etc.). And the controller 5 may be configured to determine that the object 10 of paying of respects reached the support position 30 if it is detected by the detector 29a that the object 10 of paying of respects is placed in the support portion 31. In addition, the detector 29 may also be a contact-type sensor instead of a sensor of a noncontact type. In addition, the controller 5 may be configured to determine whether the object 10 of paying of respects reached the support position 30 based on detected information from a sensor (rotary encoder, etc.) that detects the position of the lower-end support portion 44 along the first direction X (i.e., amount of projection from the retracted position).

And the controller 5 maintains the light transmittance of the window member 8 at the value attained as a result of an increase by the light transmittance increasing control (Step #02) and maintains the amount of light from the illuminating device 90 at the value attained as a result of an increase by the light amount increasing control (Step #03), until a removal operation, by which the object 10 of paying of respects is removed from the support position 30, is initiated (Step #04; No). And when it is time to start removing the object 10 of paying of respects from the support position 30 (Step #04; Yes), the controller 5 performs a light transmittance reducing control (Step #05) by which the light transmittance of the window member 8 is reduced as well as a light amount reducing control (Step #06) by which the amount of light from the illuminating device 90 is reduced. For example, in the light transmittance reducing control (Step #05), the arrangement may be such that the light transmittance of the window member 8 is reduced to the lowest value in the adjustment range for the light transmittance. In addition, for example, in the light amount reducing control (Step #06), the arrangement may be such that the amount of light of the illuminating device 90 is reduced to the lowest value in the adjustment range for the amount of light. An object 10 of paying of respects is removed from the support position 30 when a person P visiting to pay respects finishes what they are visiting for; thus, the controller 5 may be configured to determine that it is time to start removing the object 10 of paying of respects from the support position 30 if a person P visiting to pay respects performs an operation (for example, actuation of a switch) and/or if a set amount of time elapses after a person P visiting to pay respects started what they are visiting for, among other possibilities.

Thus, the controller 5 performs a light transmittance increasing control by which the light transmittance of the window member 8 is increased and a light amount increasing control by which the amount of light of the illuminating device 90 is increased, as the object 10 of paying of respects arrives at the support position 30 through a transport operation of the transport device 20. And the controller 5 performs a light transmittance reducing control by which the light transmittance of the window member 8 is reduced and a light amount reducing control by which the amount of light of the illuminating device 90 is reduced, as the removal operation, by which the object 10 of paying of respects is removed from the support position 30 through a transport operation of the transport device 20, is initiated. Note that when the word "as" is used in an description herein to indicate that an event occurs (such as the controller 5 performing a light transmittance increasing control) "as" another event occurs (such as the object 10 of paying of respects arrives at the support position 30), the word "as" should be understood to indicate that the timings of these two events are correlated, or related to each other, so that the word "as" represents a concept not only of two events occurring at the same time but also of one of these two events occurring after the other. As an example of the latter case (one event occurring after the other), the timing for initiating the light transmittance increasing control may be set to occur after (or alternatively, before) the timing of the arrival of the object 10 of paying of respects at the support position 30 by a set amount of time.

The storage facility 1 in accordance with the present embodiment is further provided with the following arrangements to improve visual effects (designed to convey solemnness and a quality of luxury, etc.) in each respects-paying area 6.

As shown in FIGS. 2 and 3, the window 52 has a plurality of openings 70 whose areas increase in a stepwise manner from the support position 30 side toward the respects-paying position S side (i.e., toward the first side X1); that is, for any two adjacent openings 70, an area of one opening 70 is larger than an area of an opening 70 that is closer to the support position 30 and farther away from the respects-paying position S. More specifically, a first frame member 81, a second frame member 82, and a third frame member 83 are provided (in that order from the first side X1) to the portion of the partition wall 50 to which the window 52 is provided. Each of the first frame member 81, the second frame member 82, and the third frame member 83 is generally formed in a shape of a flat plate and is installed in such an attitude that its surfaces extend perpendicular to the first direction X. A generally rectangular opening 70 that penetrates in a direction of thickness (the first direction X) is formed in each frame member (81, 82, 83). And the opening 70 (second opening 72) formed in the second frame member 82 has a larger area than the opening 70 (the third opening 73) formed in the third frame member 83 whereas the opening 70 (the first opening 71) formed in the first frame member 81 has a larger area than the second opening 72. And the second opening 72 is formed to include or encompass the entire third opening 73 within it as seen along the first direction X whereas the first opening 71 is formed to include the entire second opening 72 within it as seen along the first direction X. As shown in FIG. 3, the direction in which an object 10 of paying of respects is looked at from the view position of a person P visiting to pay respects is parallel to, or approximately parallel to, the first direction X; thus, the arrangement of forming each opening (71, 72, 73) as described above can provide a feeling of depth in the window 52 to the person P visiting to pay respects in the respects-paying position S. Note that the number of the openings 70 in the window 52 may be a number other than three and may be changed as desired.

As shown in FIG. 3, the window member 8 is located in the opening 70 (the first opening 71) that is closest to the respects-paying position S (farthest toward the first side X1) among the plurality of openings 70. That is, the window member 8 is formed in a general shape of a flat plate that is dimensioned to fit into the first opening 71 and is fixed to the first frame member 81 such as to close the entire first opening 71. On the other hand, the window member 8 is not provided in the second opening 72 or in the third opening 73, to leave them open. When the window 52 is provided with a plurality of openings 70, at least one of the openings 70 would have a window member 8 provided therein; and, the window member 8 is provided in only one of the plurality of openings 70 in the present embodiment.

In addition, as shown in FIG. 3, with a plurality of openings 70 in the window 52, the plurality of light sources of the illuminating device 90 are distributed (i.e. located at different positions) along the first direction X such that one or more light sources are located in an area around each of the plurality of openings 70 at a position or positions on the side of the support position 30 (i.e., on the second side X2). More specifically, a plurality of light sources of the illuminating device 90 are distributed and located at three different positions along the first direction X including a position or positions on the side of the support position 30 in an area around the first opening 71, a position or positions on the side of the support position 30 in an area around the second opening 72, and a position or positions on the side of the support position 30 in an area around the third opening 73. As shown in FIG. 3, with a first light source unit 91 being one or more light sources located at a position or positions on the side of the support position 30 in an area around the first opening 71, a second light source unit 92 being one or more light sources located at a position or positions on the side of the support position 30 in an area around the second opening 72, and a third light source unit 93 being one or more light sources located at a position or positions on the side of the support position 30 in an area around the third opening 73, the first light source unit 91 is located on the outer surface of the first frame member 81 that faces toward the second side X2, the second light source unit 92 is located on the outer surface of the second frame member 82 that faces toward the second side X2, and the third light source unit 93 is located on the outer surface of the third frame member 83 that faces toward the second side X2. Each of the first light source unit 91, the second light source unit 92, and the third light source unit 93 consists of one or more point or localized sources, one or more extended light sources, and one or more surface, or two dimensional, light sources, or any combination thereof. And by so positioning the plurality of light sources (the first light source unit 91, the second light source unit 92, and the third light source unit 93 in the present example) of the illuminating device 90, the placement of the light sources at different locations along the first direction X can be used to enhance the visual effects created by the illuminating device 90. The timing for changing the amount of light by a light amount increasing control and/or light amount reducing control may be made different among the first light source unit 91, the second light source unit 92, and the third light source unit 93.

In the present embodiment, the first light source unit 91 is located on the outer surface of the first frame member 81 that faces toward the second side X2, and adjacent and/or along at least a part of a rectangular outline of the first opening 71: the second light source unit 92 is located on the outer surface of the second frame member 82 that faces toward the second side X2, and adjacent and/or along at least a part of a rectangular outline of the second opening 72: and, the third light source unit 93 is located on the outer surface of the third frame member 83 that faces toward the second side X2, and adjacent and/or along at least a part of a rectangular outline of the third opening 73. Note that each light source unit may be positioned such that it extends over the entire outline of the corresponding opening (the first opening 71 in case of the first light source unit 91) or such that it extends over a part of the outline of the corresponding opening (for example, only along any two opposite sides of the rectangular outline of the opening).

[Other Embodiments]

Other embodiments of a storage facility for objects of paying of respects are described next.

(1) In the embodiment described above, an example arrangement is described in which the controller 5 is configured to increase both the light transmittance of the window member 8 and the amount of light from the illuminating device 90 as an object 10 of paying of respects arrives at the support position 30 through a transport operation of the transport device 20. However, the invention is not limited to such an arrangement. The controller 5 may be configured to increase only one of the light transmittance of the window member 8 and the amount of light from the illuminating device 90 as an object 10 of paying of respects arrives at the support position 30 through a transport operation of the transport device 20. In such a case, the other of the light transmittance of the window member 8 and the amount of light from the illuminating device 90 may be increased at a timing unrelated to the arrival of an object 10 of paying of respects at the support position 30 through a transport operation of the transport device 20 (for example, at a timing determined based on a manual operation performed by a person P visiting to pay respects).

(2) In the embodiment described above, an example arrangement is described in which the controller 5 is configured to reduce both the light transmittance of the window member 8 and the amount of light of the illuminating device 90, as the removal operation, by which the object 10 of paying of respects is removed from the support position 30 through a transport operation of the transport device 20, is initiated. However, the invention is not limited to such an arrangement. The controller 5 may be configured to reduce only one of the light transmittance of the window member 8 and the amount of light of the illuminating device 90, as the removal operation, by which the object 10 of paying of respects is removed from the support position 30 through a transport operation of the transport device 20, is initiated.

(3) In the embodiment described above, an example arrangement is described in which the window 52 has a plurality of openings 70 whose areas increase in a stepwise manner toward the first side X1. However, the invention is not limited to such an arrangement. The window 52 may have a plurality of openings 70 having the same area. Alternatively, the window 52 may have only one opening 70.

(4) In the embodiment described above, an example arrangement is described in which the plurality of light source units of the illuminating device 90 are distributed (i.e. located at different positions) along the first direction X such that a light source unit is located in an area around each of the plurality of openings 70 at a position or positions on the side of the support position 30 (i.e., on the second side X2). However, the invention is not limited to such an arrangement. The illuminating device 90 may have one or more light source units that are located at the same position along the first direction X. Alternatively, the illuminating device 90 may have one or more light source units that are located at different positions along the first direction X with the number of such positions being different from the number of openings 70 provided to the window 52. In addition, the positioning of each light source unit (91, 92, 93) shown in FIG. 3 is merely an example of the positioning. And each light source or light source unit may be located at any other location.

(5) In the embodiment described above, an example arrangement is described in which the window member 8 is located in the opening 70 that is closest to the respects-paying position S among the plurality of openings 70. However, the invention is not limited to such an arrangement. The window member 8 may be located in the opening 70 that is closest to the support position 30 among the plurality of openings 70 as in an example shown in FIG. 6. Or, the window member 8 may be located in an opening 70 that is not closest to the respects-paying position S or to the support position 30 among the plurality of openings 70, i.e., the window member 80 may be located in an opening 70 located between these two openings 70 along the first direction X. The position of the window member 8 may be selected depending on a method for creating visual effects. For example, the window member 8 may be located in the opening 70 that is closest to the support position 30 among the plurality of openings 70 to have visual effects that creates an image suggestive of spot lights directed toward the object 10 of paying of respects. Or the window member 8 may be located in the opening 70 that is closest to the respects-paying position S among the plurality of openings 70 to have visual effects that creates an image suggestive of indirect light illuminating the object 10 of paying of respects. In addition, the position of the window member 8 may also be selected depending on the material of the window member 8 (variable-light-transmittance member 8a). For example, based on the highest value in the adjustment range for the light transmittance (i.e. the light transmittance in a transparent state), the window member 8 may be located in the opening 70 that is closest to the respects-paying position S among the plurality of openings 70 when the light transmittance in a transparent state is high whereas the window member 8 may be located in the opening 70 that is closest to the support position 30 among the plurality of openings when the light transmittance in a transparent state is low. In addition, in the embodiment described above, an example arrangement is described in which the window member 8 is located in only one of the plurality of openings 70. However, two or more among the plurality of openings 70 may each have a window member 8 located therein.

(6) In the embodiment described above, an example arrangement is described in which the transfer device 45 includes a slide-out mechanism which projects and retracts the lower-end support portion 44 along, i.e., parallel to, the first direction X. However, the invention is not limited to such an arrangement. Among other possibilities, the arrangement may be such that the transfer device 45 includes a mechanism that projects and retracts along the first direction X a pair of clamps that can hold an object 10 of paying of respects from the both sides along the second direction Y, or may be such that the transfer device 45 includes a mechanism that projects and retracts along the first direction X a grip portion which grips a projection (flange portion, etc.) provided in an upper portion of an object 10 of paying of respects, or may be such that the transfer device 45 includes a mechanism that projects and retracts along the first direction X an engaging portion (one or more hooks) which can releasably engage one or more engaged portions (handles etc.) provided to a side face of each object 10 of paying of respects.

(7) In the embodiment described above, an example arrangement is described in which the partition wall 50 is a member provided in addition to a wall 7. However, the invention is not limited to such an arrangement. The partition wall 50 may be formed integrally with a wall 7. That is, a portion of a wall 7 that is located in the corresponding respects-paying area 6 may form, or function as, a partition wall 50.

(8) In the embodiment described above, an example arrangement is described in which the transport device 20 is a stacker crane. However, the invention is not limited to such an arrangement. The transport device 20 may be a transport device other than a stacker crane, such as, among other possibilities, a ceiling or overhead transport vehicle capable of traveling along a travel rail (travel path) provided on a ceiling side to transport an article, or an article transport vehicle capable of traveling on a floor surface autonomously while recognizing or detecting its own current position. In addition, in the embodiment described above, an example arrangement is described in which the transport device 20 consists of a single transport device; however, the transport device 20 may include two or more transport devices each of which is capable of transferring an object 10 of paying of respects to another.

(9) In the embodiment described above, an example arrangement is described in which an object 10 of paying of respects is a container (a container for religious purposes) which has a general outer shape of a rectangular parallelepiped. However, the invention is not limited to such an arrangement. Each object 10 of paying of respects may be a container which is for holding, or configured to hold, one or more housed objects 2 such as cremated remains or a funerary urn but which does not have a general outer shape of a rectangular parallelepiped. For example, an object 10 of paying of respects may be a container which is shaped to resemble a building for religious purposes, such as a temple, shrine, or cathedral, or may be a container which has an outer shape of an object of worship or prayer, such as, Christ, Buddha, a bodhisattva (e.g., Kshitigarbha, a guardian deity of children, etc.) or a religious saint or personage. In addition, a thing or material that is placed over a "housed object 2" from above (a thing or material that covers an object or material 2 from above and sides) is also considered to fall within the meaning of a container as used in the present specification. In addition, an object 10 of paying of respects does not have to be and may not be a container. For example, an object 10 of paying of respects may be a mortuary tablet, or a statue of Buddha, Christ or Mary, etc., as described above. Therefore, an object 10 of paying of respects may be an object (such as cremated remains or a funerary urn containing cremated remains, etc.) representing one (such as the deceased, etc.) being paid respects to, or may be a container for containing, or configured to contain, such object.

(10) In the embodiment described above, an example arrangement is described in which the support portion 31 is provided at the support position 30. However, the invention is not limited to such an arrangement. The arrangement may be such that no support portion is provided at the support position 30 and instead may be such that, the object 10 of paying of respects remains being held in the support position 30 by the lower-end support portion 44 after the object 10 of paying of respects is moved to the support position 30 by the lower-end support portion 44 and until the person P visiting to pay respects has finished paying respects. In addition, as in an example shown in FIG. 7, the arrangement may be such that, in addition to a first transport device 21 which corresponds to the transport device 20 in the embodiment described above, the transport device 20 includes a second transport device 22 which transports an object 10 of paying of respects between the first transport device 21 and the support position 30 and such that the object 10 of paying of respects remains supported by the second transport device 22 at the support position 30 until the person P visiting to pay respects finishes paying respects. Note that, in the example shown in FIG. 7, the transporting path of the object 10 of paying of respects by the second transport device 22 is formed to extend along the first direction X with one end of the transporting path defining a relay portion at which an object 10 of paying of respects is transferred between the first transport device 21 and the second transport device 22 and with other end of the transporting path defining the support position 30. In such an arrangement, a determination may be made as to whether the object 10 of paying of respects has reached the support position 30 based, for example, on detected information from a sensor for detecting the position of the object 10 of paying of respects on the second transport device 22. The second transport device 22 is or includes a roller conveyor in the example shown in FIG. 7. However, the second transport device 22 may be or include, a transport mechanism other than a roller conveyors, such as a belt conveyor and a slat conveyor.

(11) In the embodiment described above, an example arrangement is described in which each storage section 65 is configured to store one object 10 of paying of respects. However, the invention is not limited to such an arrangement. The arrangement may be such that each storage section 65 stores a plurality of objects 10 of paying of respects (for example, two objects 10 of paying of respects) one placed next to another in the first direction X. In addition, in the embodiment described above, an example arrangement is described in which the storage facility 1 includes both the first storage rack 61 and the second storage rack 62; however, the arrangement may such that the storage facility 1 includes only one of the first storage rack 61 and the second storage rack 62.

(12) Note that an arrangement disclosed in any of the embodiments described above can also be used in combination with any arrangement disclosed in any other embodiment unless inconsistency arises. This applies to any combination of embodiments which are described as "other embodiments". Regarding any other arrangements and features, the embodiments disclosed in the present description are provided for the purposes of illustration only regarding all aspects. Therefore, it is possible to make various suitable changes without departing from the spirit of the present disclosure.

[Summary of Embodiments Described Above]

A brief summary of the storage facility for objects of paying of respects described above is provided next.

A storage facility for objects of paying of respects comprises: a plurality of storage sections each configured to store an object of paying of respects; a respects-paying area which includes an area for a person, visiting to pay respects, to pay respects; and a transport device configured to transport an object of paying of respects between any of the plurality of storage sections and a support position provided in the respects-paying area; a partition wall located in the respects-paying area to partition off the support position from a respects-paying position for a person visiting to pay respects; a window member including a variable-light-transmittance member whose light transmittance is adjustable; an illuminating device for which an amount of light emitted thereby is adjustable; and a controller configured to control the light transmittance of the window member and the amount of light emitted by the illuminating device; wherein a window for allowing the person visiting to pay respects to view an object of paying of respects is formed in an area, of the partition wall, toward which the object of paying of respects faces when supported in the support position, wherein the window member is located in the window, wherein the illuminating device is so positioned that light therefrom reaches the object of paying of respects supported in the support position, and wherein the controller is configured to increase at least one of the light transmittance of the window member and the amount of light emitted by the illuminating device as an object of paying of respects arrives at the support position through a transport operation of the transport device.

With the arrangement described above, the window member including a variable-light-transmittance member whose light transmittance is adjustable is provided to the window, and the illuminating device for which the amount of emitted light can be adjusted is so positioned that the light therefrom can reach the object of paying of respects supported in the support position. Therefore, the visibility of an area on the support position side with respect to the window as seen by the person visiting to pay respects can be controlled by adjusting the light transmittance of the window member and/or by adjusting the amount of light from the illuminating device. And the controller, configured to control the light transmittance of the window member and the amount of light emitted by the illuminating device, is configured to increase at least one of the light transmittance of the window member and the amount of light emitted by the illuminating device as an object of paying of respects arrives at the support position through a transport operation of the transport device. Thus, for example, the visibility can be maintained at a reduced and low level before the arrival of the object of paying of respects at the support position and the visibility can be maintained at a high level after the arrival of the object of paying of respects at the support position. This arrangement makes it more unlikely and difficult for the attention of a person visiting to pay respects to be drawn to the fact that an object of paying of respects is transported by the transport device, thus reducing any loss of solemn atmosphere in the respects-paying area, before the arrival of the object of paying of respects at the support position. And the visibility of the object of paying of respects at the support position as seen from a person visiting to pay respects can be maintained at a high level after the arrival of the object of paying of respects at the support position for an increased satisfaction of the person visiting to pay respects.

Note that there is an added benefit that such visibility can be controlled while maintaining the solemn atmosphere in the respects-paying area because the control of the visibility of the area on the support position side of the window as seen from a person visiting to pay respects is performed by adjusting the light transmittance of the window member and/or the amount of light from the illuminating device, which is a method that would not involve moving mechanical parts that may be visible to the person paying respects.

Thus, with the arrangement described above, a storage facility for objects of paying of respects can be provided in which any loss of the solemn atmosphere caused by the transporting of an object of paying of respects by a transport device can be reduced.

Here, the window preferably includes a plurality of openings whose areas increase in a stepwise manner from a support position side toward a respects-paying position side wherein at least one of the plurality of openings preferably has the window member provided therein.

This arrangement can provide a feeling of depth in the window (compared with a case where the window has one opening) which helps enhance the visual effects (designed to convey solemnness and a quality of luxury, etc.) for the respects-paying area.

When the window includes a plurality of openings as described above, the window member is preferably provided in an opening that is closest to the respects-paying position, among the plurality of openings.

With such an arrangement, undesired objects or substance such as dust, debris, rain, or insects can be prevented from entering the support position side through the window from the side of the respects-paying position for the person visiting to pay respects, by the opening that is closest to the respects-paying position among the plurality of the openings. Thus, such undesired objects or substance can be prevented from entering not only the area of the support position but also areas between the openings, which helps properly maintain the functionality of the storage facility for objects of paying of respects as well as its gracious quality. This arrangement is suitable especially when a respects-paying position for a person visiting to pay respects is located outdoors.

In addition, when the window includes a plurality of openings as described above, the illuminating device preferably includes a plurality of light sources, wherein the plurality of light sources are preferably located at different positions such that at least one light source is located in an area around each of the plurality of openings and on a side of the support position.

Compared with a case in which all of the plurality of light sources are located at the same position along a direction directed from the respects-paying position toward the support position, such an arrangement above allows the placement of the light sources at different locations along such direction to be used to enhance the visual effects created by the illuminating device. Such arrangement can enhance the visual effects (designed to convey solemnness and a quality of luxury, etc.) for the respects-paying area.

It is considered to be sufficient for the storage facility for object(s) of paying of respects in accordance with the disclosure to perform at least one of the results or effects described above.

What is claimed is:

1. A storage facility for objects of paying of respects comprising:
   a plurality of storage sections each configured to store an object of paying of respects;
   a respects-paying area which includes an area for a person, visiting to pay respects, to pay respects; and
   a transport device configured to transport an object of paying of respects between any of the plurality of storage sections and a support position provided in the respects-paying area;
   a partition wall located in the respects-paying area to partition off the support position from a respects-paying position for a person visiting to pay respects;
   a variable-light-transmittance member whose light transmittance is adjustable;
   an illuminating device for which an amount of light emitted thereby is adjustable; and
   a controller configured to control the light transmittance of the variable-light-transmittance member and the amount of light emitted by the illuminating device;
   wherein a window for allowing the person visiting to pay respects to view an object of paying of respects is formed in an area, of the partition wall, toward which the object of paying of respects faces when supported in the support position,
   wherein the variable-light-transmittance member is located in the window,
   wherein the illuminating device is so positioned that light therefrom reaches the object of paying of respects supported in the support position,
   wherein the illuminating device includes a light source which is located in an area around an opening of the window at a position on a side of the support position, and
   wherein the controller is configured to increase at least one of the light transmittance of the variable-light-transmittance member and the amount of light emitted by the illuminating device as an object of paying of respects arrives at the support position through a transport operation of the transport device.

2. The storage facility for objects of paying respects as defined in claim 1, wherein the plurality of storage sections are arranged in a plurality of horizontal rows with one horizontal row located above another along a vertical direction and in a plurality of vertical rows with one vertical row located next to another along a horizontal direction, and the support position is provided in place of one of the plurality of storage sections.

3. A storage facility for objects of paying of respects comprising:
   a plurality of storage sections each configured to store an object of paying of respects;
   a respects-paying area which includes an area for a person, visiting to pay respects, to pay respects; and
   a transport device configured to transport an object of paying of respects between any of the plurality of storage sections and a support position provided in the respects-paying area;
   a partition wall located in the respects-paying area to partition off the support position from a respects-paying position for a person visiting to pay respects;
   a variable-light-transmittance member whose light transmittance is adjustable;
   an illuminating device for which an amount of light emitted thereby is adjustable; and
   a controller configured to control the light transmittance of the variable-light-transmittance member and the amount of light emitted by the illuminating device;
   wherein a window for allowing the person visiting to pay respects to view an object of paying of respects is formed in an area, of the partition wall, toward which the object of paying of respects faces when supported in the support position,
   wherein the variable-light-transmittance member is located in the window,
   wherein the illuminating device is so positioned that light therefrom reaches the object of paying of respects supported in the support position,
   wherein the controller is configured to increase at least one of the light transmittance of the variable-light-transmittance member and the amount of light emitted by the illuminating device as an object of paying of respects arrives at the support position through a transport operation of the transport device,
   wherein the window includes a plurality of openings whose areas increase in a stepwise manner from a support position side toward a respects-paying position side, and
   wherein at least one of the plurality of openings has the variable-light-transmittance member provided therein.

4. The storage facility for objects of paying of respects as defined in claim 3, wherein the variable-light-transmittance member is provided in an opening that is closest to the respects-paying position, among the plurality of openings.

5. The storage facility for objects of paying of respects as defined in claim 3, wherein the illuminating device includes a plurality of light sources, and wherein the plurality of light sources are located at different positions such that at least one light source is located in an area around each of the plurality of openings and on a side of the support position.

* * * * *